United States Patent
Flood (10) Patent No.: US 6,411,857 B1
(45) Date of Patent: Jun. 25, 2002

(54) REDUNDANT, MULTITASKING INDUSTRIAL CONTROLLERS WITH SYNCHRONIZED DATA TABLES

(75) Inventor: Mark A. Flood, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/303,940

(22) Filed: May 3, 1999

Related U.S. Application Data (63) Continuation of application No. 08/852,710, filed on May 7, 1997.

(51) Int. Cl.⁷ .............................................. G05B 19/18
(52) U.S. Cl. .......................................... 700/4; 700/82
(58) Field of Search ........................... 700/2, 17, 4, 20, 700/21, 25, 82

(56) References Cited

U.S. PATENT DOCUMENTS

| | | | | |
|---|---|---|---|---|
| 4,377,000 A | * | 3/1983 | Staab ........................... | 714/55 |
| 4,872,136 A | * | 10/1989 | Cieri et al. .................... | 710/58 |
| 5,392,424 A | * | 2/1995 | Cook ............................ | 714/52 |
| 5,564,049 A | * | 10/1996 | Schmidt .................... | 707/104.1 |
| 5,619,409 A | * | 4/1997 | Schultz et al. ................. | 700/17 |
| 5,636,124 A | * | 6/1997 | Rischar et al. .............. | 700/100 |

\* cited by examiner

*Primary Examiner*—Leo Picard
*Assistant Examiner*—Zoila Cabrera
(74) *Attorney, Agent, or Firm*—Keith M. Baxter; Alexander M. Gerasimow; William R. Walbrun (57) ABSTRACT

An industrial control system employs a primary and secondary controller each having a processor and at least one I/O data table. Updating of the secondary processor's I/O data table is performed prior to the same data being transmitted to the controlled process. This eliminates possible retrogressive control at the time of switch-over of control from the primary industrial controller to the secondary industrial controller. Additional I/O data tables may be provided in each of the primary and secondary industrial controllers. In the case of the secondary industrial controller, this duplicate I/O data table temporarily holds data until the transmission is complete preventing the partial update of the working I/O data table of the secondary industrial controller. The duplicate I/O data table in the primary industrial controller allows simultaneous outputting of the I/O data transmitted to the controlled process without corruption while the user program of the primary industrial controller resumes execution.

5 Claims, 4 Drawing Sheets

| OUTPUT | PRIMARY I/O TABLE | SECONDARY I/O TABLE |
|--------|-------------------|---------------------|
| 0 | 0 | 0 |
| 1 | 1 | 0 |
| 1 | X | 0 |
| 0 | 0 | 0 |
| 1 | 1 | 1 |

REDUNDANT, MULTITASKING INDUSTRIAL CONTROLLERS WITH SYNCHRONIZED DATA TABLES

CROSS-REFERENCE TO RELATED APPLICATIONS

This is a continuation of application Ser. No. 08/852,710 filed May 7, 1997.

BACKGROUND OF THE INVENTION

The present invention relates to industrial controllers and in particular to an industrial controller system having a secondary controller providing back-up control capability.

Industrial controllers are special purpose computers used for controlling factory automation and the like. Under the direction of a stored program, a processor of the industrial controller examines a series of inputs reflecting the status of a controlled process and changes outputs affecting control of the controlled process. The stored control program is continuously executed in a series of execution cycles.

The inputs received by the industrial controller from the controlled process and the outputs transmitted by the industrial controller to the controlled process are normally passed through one or more input/output (I/O) modules which serve as an electrical interface between the controller and the controlled process. The inputs and outputs are recorded in an I/O data table in processor memory. Input values may be asynchronously read from the controlled process by specialized circuitry. Output values are written directly to the I/O data table by the processor, then communicated to the controlled process by the specialized communications circuitry.

Industrial controllers must often provide uninterrupted and reliable operation for long periods of time. One method of ensuring such operation is by using redundant, secondary controller components (including processors) that may be switched in to replace primary controller components while the industrial controller is running. In the event of a failure of a primary component, or the need for maintenance of the components, for example, the secondary components may be activated to take over control functions. Maintenance or testing of the control program maybe performed with the primary processor reserving the possibility of switching to the secondary processor (and a previous version or state of the control program) if problems develop.

Ideally, the switch-over between controllers or their components should occur without undue disruption of the controlled process. For this to be possible, the secondary processor must be running the same program (and maintaining its current state) and must be working with the same data in its I/O data table as is the primary processor.

The same control program may be simply pre-stored in each of the primary and secondary processors. The data of the I/O data table, however, cannot be pre-stored but changes continuously during the controlled process. Further, because controllers are I/O intensive, there is typically a large amount of data in the I/O data table. For this reason, transmitting the data to the secondary processor is difficult.

In order to effectively update the secondary processor with large amounts of I/O data, prior art controllers have continuously and asynchronously transmitted I/O data from the primary processor to the secondary processor during execution of the control program. Allowing the control program to continue to run, prevents the control process from being interrupted by the data transfer. Nevertheless, there are problems with this approach.

Asynchronous transfer means that at the time of switch-over to the secondary processor, the I/O data table of the secondary controller may have only been partially updated. Further, even the updated part of the I/O data table may be stale because the control program has continued to execute and change that data after its transmission. This I/O data will be termed "time fragmented" because it is not simply a uniformly delayed version of the I/O data table of the primary processor, but a version with different data delayed by sharply different amounts. Time fragmented data represents a control state that never existed because it includes I/O data taken from two or more different execution cycles of the control program.

A second problem that may occur at the time of switch-over is a so-called "data bump" where an output is changed back to an old state by a secondary controller only to be quickly restored to its original value as the secondary controller continues the control process. Data bumps can cause a momentary reversal of the control process with serious consequences to the controlled equipment. Unfortunately, even trivially stale data can cause data bumps.

BRIEF SUMMARY OF THE INVENTION

The present invention eliminates data bumps by freezing the transmission of outputs to the control process until after those outputs have been successfully communicated to the I/O data table of the secondary processor. This delay in output transmission is made possible by techniques which allow consolidation of the transmission of I/O data to the secondary industrial controller to a short interval that does not unduly interrupt the control process.

Time fragmentation of the data at the secondary controller is likewise reduced by the use of two I/O data tables, one used to quarantine the data before it has been fully transmitted. Partial transmission of data to the secondary controller occurring just before the secondary controller assumes control of responsibilities is not loaded into the I/O data table used by the secondary controller and thus does not cause a time fragmentation of that data.

Specifically, the present invention provides a primary industrial controller providing output values to a controlled process and communicating with a secondary industrial controller over a link. The primary industrial controller includes an electronic memory having a user program describing the control of the process and a primary I/O data table holding the output values provided to the controlled process. A processor communicating with the electronic memory operates to execute the user program to write output values to the I/O data table according to the user program. The processor then transmits the output values in the primary I/O data table to a secondary I/O data table of the secondary industrial controller without transmitting the output values yet to the controlled process. Only after a completion of the transmission of the output values to the secondary I/O data table does the processor transmit the output values to the controlled process.

Thus, it is one object of the invention to eliminate the possibility of data bumps as described above. By ensuring that the data is fully received by the secondary controller prior to its going to the controlled process, there is no possibility of the secondary controller improperly updating the controlled process with stale data at the time of a switch-over.

The transmission of output values to the secondary I/O data table may occur at a predefined point in the execution of the user program such as the end of the user program.

Thus it is another object of the invention to coordinate the transmission of data to the secondary processor and the controlled process to a logical point within the program.

The primary industrial controller may have multiple user programs each having predefined points where the output values are transmitted to the secondary I/O data table.

Thus it is another object of the invention to minimize any single interruption of the control process during the transmission of data to the secondary industrial controller and during the consequent delay in the transmission of output values to the controlled process. By allowing each control program to initiate a transfer of the data it has changed, each interruption of the control process in the transmission of that data is correspondingly reduced.

The electronic memory of the primary industrial controller may include a duplicate I/O data table and the transmission of output values to the controlled process may be performed by first transferring the output values of the primary I/O data table to the duplicate I/O data table and then transmitting the output values held in the duplicate I/O data table to the controlled process so that the primary I/O data table is freed to be modified during execution of a user program.

Thus it is another object of the invention to ensure that the data transmitted to the secondary industrial controller matches that ultimately provided to the outputs. The use of a duplicate I/O data table allows the user program to again begin writing I/O data to the primary I/O data table without corrupting, that data being transmitted to the controlled process.

The secondary industrial controller may include a secondary I/O data table and a quarantine I/O data table and its processor may operate to receive transmission of the output values from the primary industrial controller to the quarantine I/O data table. Only after completion of the transmission of the output values into the quarantine I/O data table are the output values transferred to the secondary I/O data table. At a switch-over time, the secondary industrial controller executes the copy of the user program in its memory to modify the output values in the secondary I/O data table and to transmit the output values to the controlled process.

Thus it is another object of the invention to prevent time fragmentation of the I/O data table of the secondary processor in the event of incomplete transmission of the I/O data from the primary industrial controller to the secondary industrial controller at the time of switch-over. The use of the quarantine I/O data table allows the secondary I/O data table to remain unmodified in the event of such partial transmissions and the control to revert to the use of that secondary I/O data table data in these cases.

The foregoing and other objects and advantages of the invention will appear from the following description. In this description reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

DETAILED DESCRIPTION OF THE INVENTION

Figure 1:
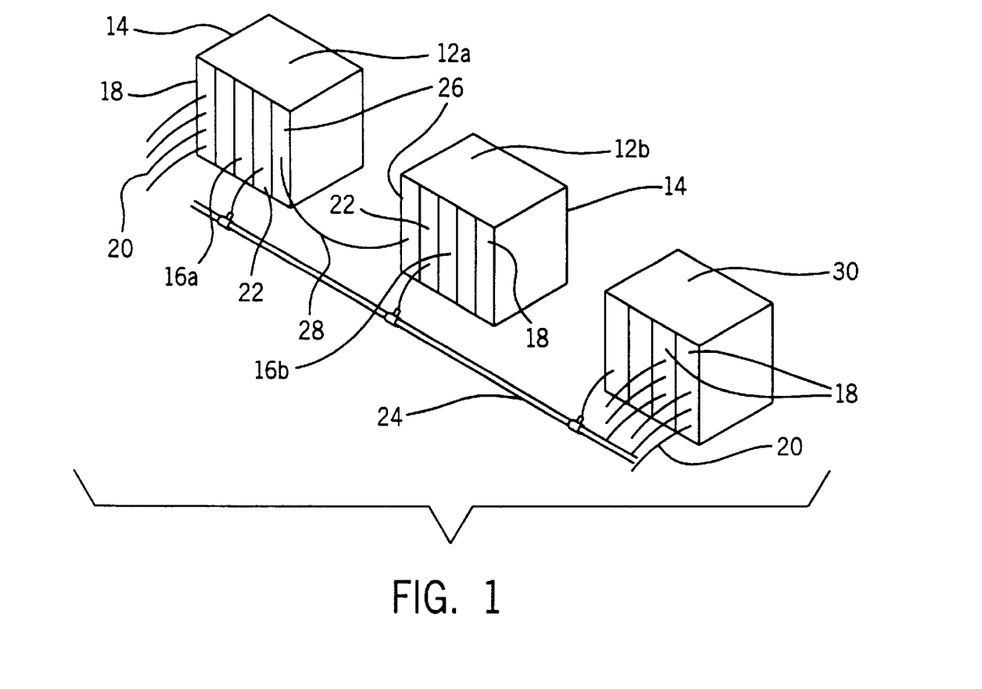
FIG. 1 is a simplified perspective view of an industrial controller employing a primary and secondary controller communicating on a common link with a remote I/O rack and on a separate communication bus for I/O data table transfer.

Referring now to FIG. 1, an industrial control system of the present invention includes primary controller 12(a) and secondary controller 12(b) housed in separate racks 14. Each rack 14 holds processor modules 16(a) and 16(b), respectively, to be described in detail below.

Within the racks 14 of primary controller 12a are I/O modules 18 having I/O lines 20 communicating with a controlled process (not shown) for transferring input and output signals between the controllers 12(a) and the controlled process. In addition, both the racks 14 include communication modules 22 connecting the controllers 12(a) and 12(b) to a common general purpose link 24 and communication modules 26 connecting controllers 12(a) and 12(b) to a special dedicated communication link 28. The general purpose communication link 24 may connect to an I/O rack 30 having additional I/O modules 18 and I/O lines 20.

The dedicated communication link is used for the communication of I/O data between the processor modules 16(a) and 16(b) and the communication of information coordinating a switch-over between the operation of the primary and secondary controllers 12(a) and 12(b).

Figure 2:
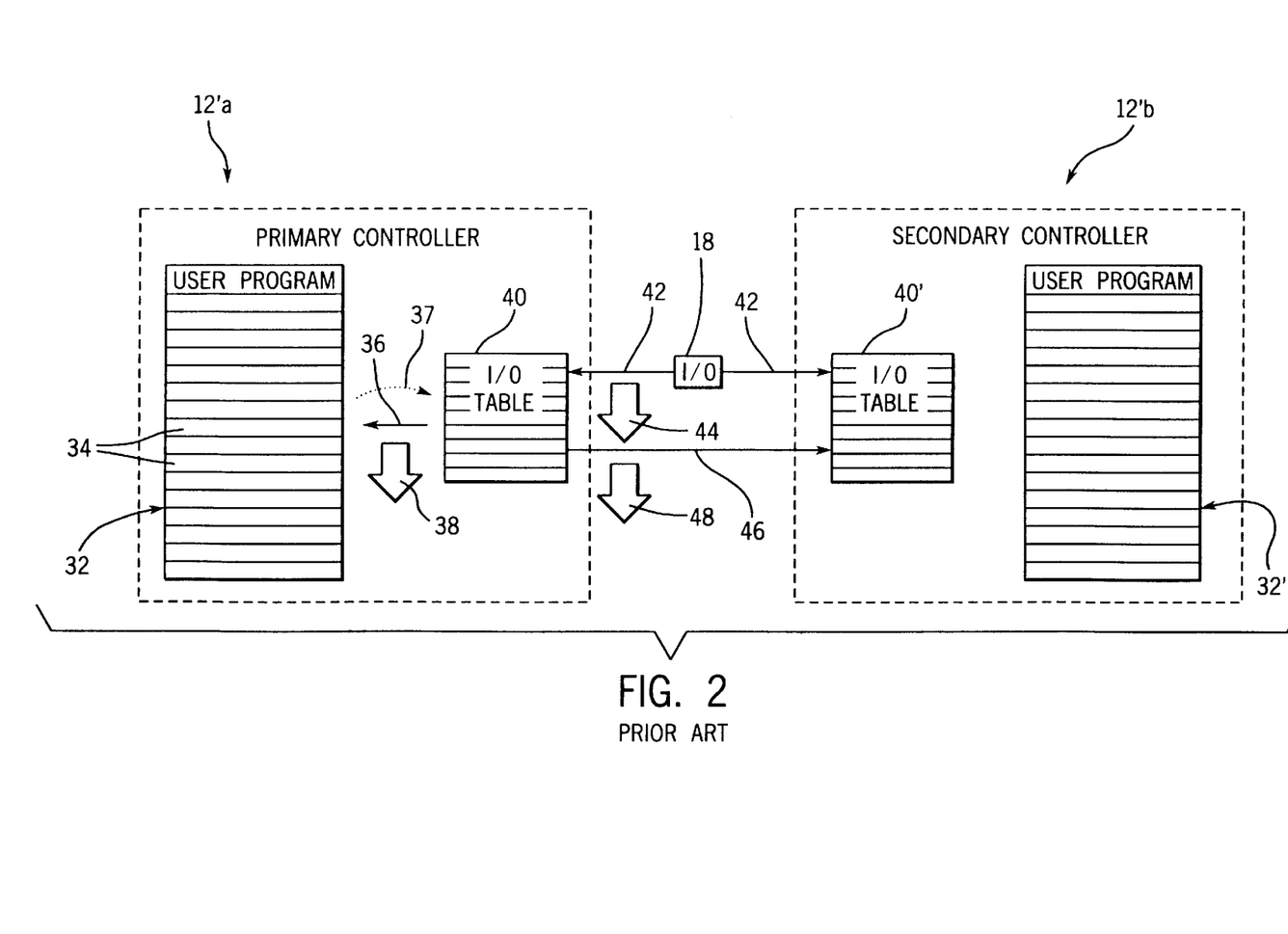
FIG. 2 is a schematic representation of prior art a synchronous transfer of data between I/O data tables of a primary and secondary industrial controller.

Referring now to FIG. 2 in a prior art system, a primary controller 12(a)' and secondary controller 12(b)' both include copies of a user program 32 comprised of a sequence of instructions 34. During operation of the primary controller 12(a)', instructions 34 are executed in repeated execution cycles 38 at a scan point 36 scanning through the user program 32 writing data 37 to an I/O data table 40.

At the same time, I/O data table 40 is asynchronously updated over link 24 with current input values 42 from I/O modules 18. Input values 42 are also received via link 24 at I/O data table 40' in the secondary controller 12(b)'. Output values in the I/O data table 40 may be transmitted (not shown) to the I/O 18 asynchronously or synchronously to the execution cycles 38 of the user program.

In the prior art, the data of the I/O data table 40 is asynchronously transferred as indicated by arrow 46 to the I/O data table 40' in secondary controller 12(b)'. This transfer of data provides the secondary controller 12(b)' with an updated I/O data table 40' in the event of a switch-over of control from the primary controller 12(a)' and proceeds through the data tables 40 and 40' in a scanning process 48.

Generally the scanning 48 of the I/O data transfer is a synchronous to the execution cycle 38 of the user program 32. Accordingly, at the completion of an execution cycle 38 of the user program 32, the I/O data table 40' will still contain some data as changed in a previous execution cycle 38 of the user program and some data reflecting the most recent execution cycle 38 of the user program 32. Further, because the user program is executed during the data transfer, some of the data in the I/O data table 40' reflecting the most recent execution cycle of the user program will no longer be current.

When control is switched to the secondary controller 12(b)', the user program 32' of secondary controller 12(b)' will begin an execution cycle of the user program 32' operating on a set of data in I/O data table 40' different from any set of data seen by the user program 32 of the primary controller 12(a)' at the beginning of its execution cycle 38. This time fragmentation of the data of the I/O data table 40' can produce anomalous behavior of the controlled process.

Figure 3:
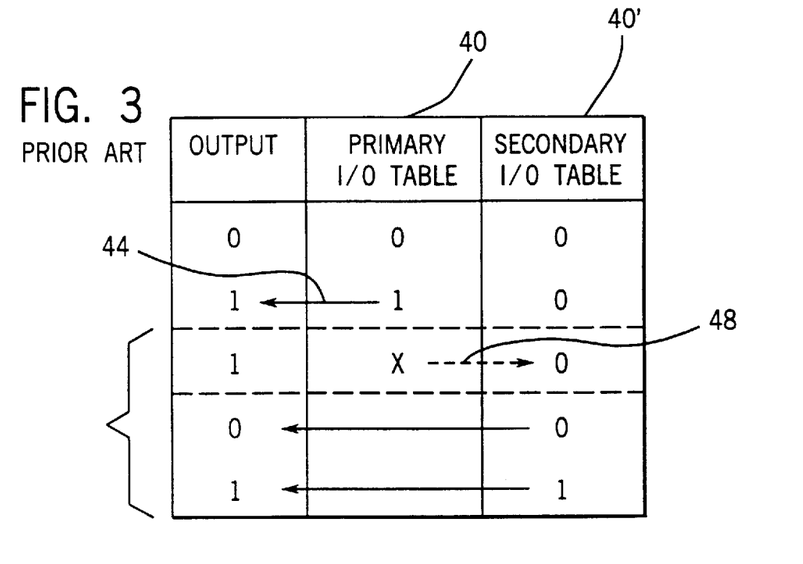
FIG. 3 is a table holding sequential output values of a prior art controller such as produces a rapid switching of an output to a previous state and then back again, such as is termed a data bump.

Further, referring now to FIGS. 2 and 3, a second problem may arise from the lack of coordination between the transfer of data from the I/O data table 40 to the I/O modules 18, and the transfer of data from I/O data table 40 to the I/O data table 40'. This is illustrated in the table of FIG. 3, where the first column represents a single binary output value to the controlled process, the second column represents the output value contained in I/O data table 40 and the third column represents the output data contained in I/O data table 40'.

At a first interval in time shown in the first row of this table, the output value is '0' and a '0' is stored in the primary and secondary I/O data tables 40 and 40'. At a second later interval of time shown in the second column of the table in FIG. 3, the user program 32 may write a value of '1' to the I/O data table 40 and this value may be transmitted to the output. At a third later time interval in time shown by the third column of FIG. 3, the primary controller may switch-over control to the secondary controller 12(b)' prior to the scanning 48 of the I/O data table 40 updating the I/O data table 40' as would have occurred otherwise shown as a dotted arrow.

Immediately after the switch-over, shown in the fourth row of the table, a scanning of I/O data table 40' reads the old value of '0' from the secondary I/O data table 40' and writes it to the output returning the output value to '0'. Finally at the last column of FIG. 3, the user program of the secondary controller 12(b)' corrects the data value of the secondary I/O data table 40' as a result of the natural execution of the user program 32 and this value is written to the output value to restore it to '1'. This transition in the last three rows of the table of FIG. 3 of the output from '1' to '0' to '1' again is a data bump and is disruptive to a controlled process both because of the retrogressive state change from the new value of '1' to the old value of '0' (which would not have normally occurred) and because of the rapid toggling of the output value between '1', '0', and '1', which may adversely affect physical equipment with limited speed and response rates.

Figure 4:
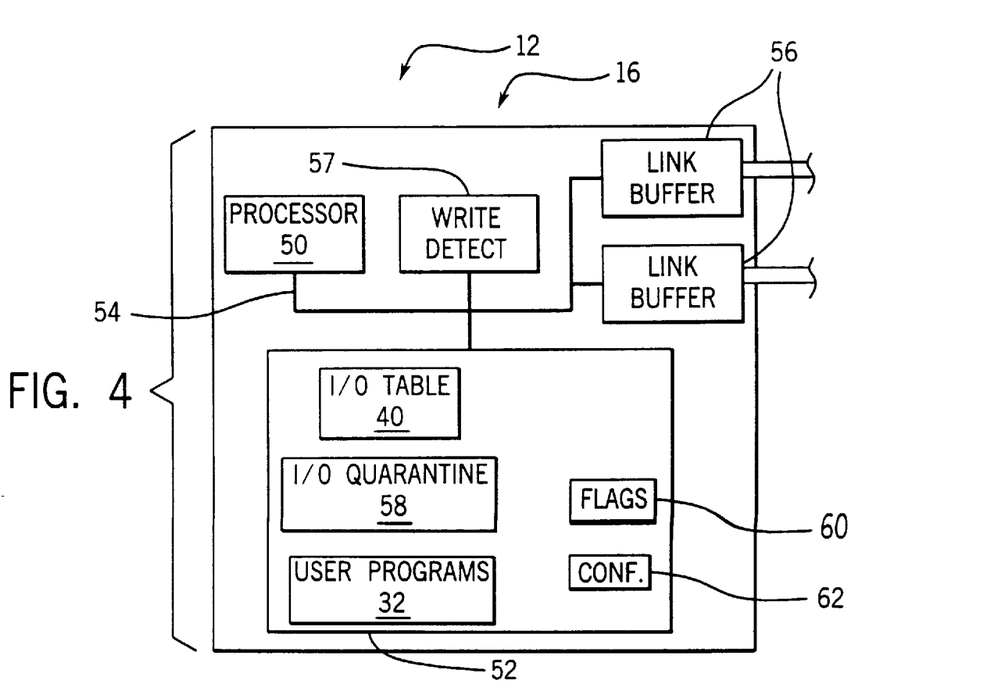
FIG. 4 is a block diagram of principal components of the controller of the present invention usable either as a primary or secondary controller.

Referring now to FIG. 4, the present invention provides for a processor module 16 in an industrial controller 12 allowing the controller to be used either as a secondary or primary controller and which has special features to avoid time fragmented data in the data table and the data bumps described above.

Generally, the processor module 16 includes a processor 50, which may execute relay ladder logic frequently used in the industrial control environment as well as general purpose arithmetic and logical instructions.

The processor 50 communicates with a memory 52 by means of an internal bus 54. Memory 52 may include volatile and non-volatile memory types well known in the art. The internal bus 54 also connects the processor 50 to input and output link buffers 56 handling communication of data on a back plane to other modules of the controller 12, including the I/O modules 18 and the communication modules 22 and 26.

The processor module 16 also includes write-detect circuitry 57 detecting writes of the processor 50 to certain addresses of the memory 52 as will be described.

Memory 52 includes an I/O data table 40 as described above and an I/O quarantine table 58 similar in size to the I/O data table. User programs 32 are also stored in memory 52 as well as a flag table 60 and a configuration register 62 as will be described.

Figure 5:
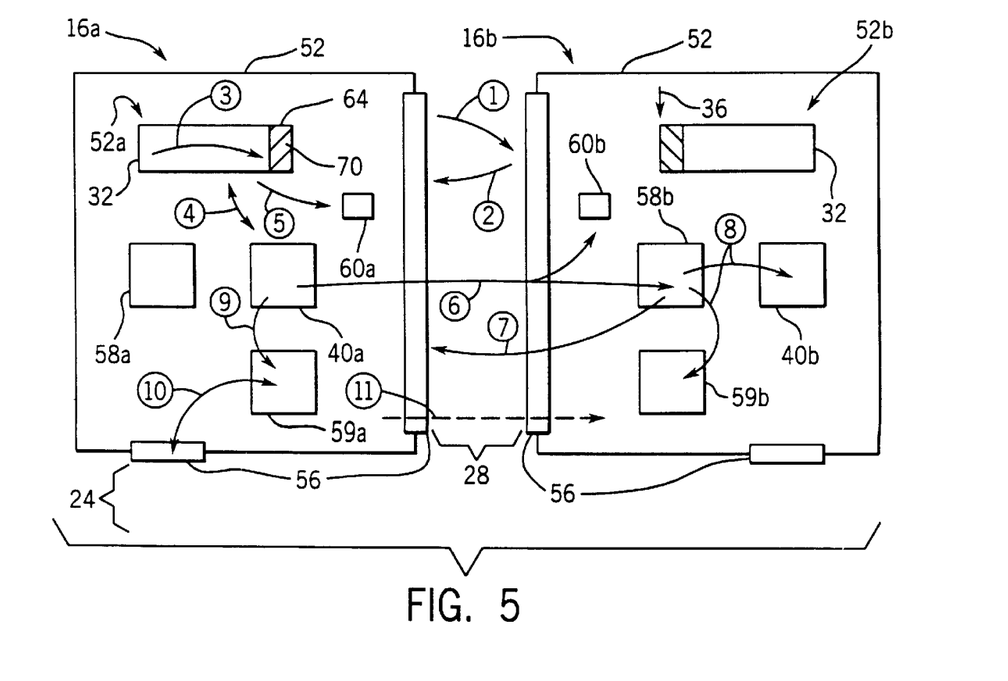
FIG. 5 is a simplified diagram of two controllers of FIG. 4 used as primary and secondary controllers showing a sequence of data flow used in the present invention.

Referring now to FIG. 5, the steps of synchronous data transfer between I/O data tables 40a and 40b of a primary processor 16(a) and secondary processor 16(b) begins when the primary processor 16(a) is ready to run a program 32. This program 32 may be one of several programs in the primary processor 16(a) distributed among several tasks of different priorities. The multi-tasking aspects of the present invention will be described below.

At the time primary processor 16(a) is ready to run a program 32, a message is transmitted to the secondary processor as indicated by the arrow labeled with a circled sequence number 1 indicating the order of the step in which the data transfer occurs. The message indicated by sequence number 1 includes a program instance number which identifies the program 32 from among many programs 32 which may be contained in the memory 52 of the processor 16(a) and many instances of program 32 which may occur in object oriented programming systems.

Processor 16(a) then receives back from processor 16(b) an acknowledgment signal indicated by sequence number 2 indicating that processor 16(b) has queued itself at the start of program 32 matching the program instance number previously provided.

In the event of a switch-over of control to the secondary processor 16(b), the secondary processor 16(b) will begin execution of program 32 at its start. It should be noted that at the time of switch-over, the primary processor 16(a) will typically be executing instructions somewhere in the body of program 32 rather than at the start. Accordingly, at the time of switch-over, there will be some rollback by the secondary processor 16(b) in the point of program execution. Nevertheless, it can be assured that the correct program 32 will be executing and that the I/O data is consistent with that of the primary processor 16(a) when it was at the beginning of its program as will be seen. Significantly, in multi-program systems, the partitioning of each of the programs with their own separate data transmissions ensures that the rollback experienced during a switch-over will be minimized to no more than the length of one program.

As indicated by sequence arrow 3, processor 16(a) then begins execution of the user program exchanging data with the I/O quarantine table 58 as indicated by sequence arrow 4. Such data exchange includes writing output values to I/O data table 40*a* and reading input values from I/O data table 40*a*.

The input values of the I/O data table 40*a* may be asynchronously updated with new input values from the controlled process, however, no output values are transmitted to I/O data table 40*a* at this time.

At the time of each writing to I/O data table 40*a* as indicated by sequence number 4, if the writing is to an output value or to an internal variable to processor 16(*a*), a flag is set in flag table 60*a* as indicated by sequence arrow 5. This setting of the flag in the preferred embodiment is accomplished by specialized circuitry of the processor 16(*a*). Specifically, the write lines to the I/O data table 40*a* are monitored and the range of addresses reserved for the I/O data table 40*a* detected. The I/O data table 40*a* is divided into subranges according to a range value held in the configuration register 62 (shown in FIG. 4). When a write to the quarantine table is detected, the particular sub range is then determined and any change within a given sub-range results in the setting of a flag in the flag table 60 unique to that sub-range. Thus, each set flag indicates that there has been a writing of an output value to the I/O data table 40*a* within a range defined by a start and ending value programmed into the configuration register 62. Hence at the conclusion of the execution of program 32, flags set in flag table 60*a* identify all changed output values in the I/O data table 40*a*.

Because this flag setting process may be accomplished by circuitry, detecting writes and ranges, it does not slow down the execution of the program 32 by processor 16(*a*).

Referring still to FIGS. 4 and 5, ultimately, in the execution of any program 32 indicated by sequence number 3, a portion of program 32 termed the synchronization point (indicated by arrow 64) is reached. The synchronization point begins a packet collection portion 70 of the program 32 that reviews the flags of flag table 60*a* (as are readable by processor 16(*a*)) and for each flag that is set takes data out of I/O data table 40*a* and forms a transmission packet that is loaded into the link buffer 56. The packet collection portion 70 merely needs to search through the flag table 60*a* and collect the necessary data, but need not attend the low level data transmission problems which are tended to by the link buffer 56. The link buffer communicates the transmission packet on the link 28 to processor 16(*b*) via module 26 and to a second quarantine table 58*b* as indicated by an arrow marked by sequence number 6. As the data is collected for transmission, the associated flags are reset.

At processor 16(*b*), the data of the transmission packets are received by the quarantine table 58*b*. This process of writing also serves to set flags in a second flag register 60*b* operating similarly to flag register 16(*a*) as has been previously described.

Processor 16(*a*) after it has finished collecting and sending transmission packets sends to processor 16(*b*), an 'unwind' signal (also indicated by sequence arrow 6) indicating a completion of the transmission. This unwind signal is necessary because the transmission of I/O data is not constant in length but depends on how much I/O data has changed. It will be understood that by transmitting only changed I/O data, however, the time required for transmission is much reduced. The unwind signal may also contain an instance number indicating which portion of the program has been executed by the primary processor so that the secondary processor can take the program portion of its run list when the unwind command is received.

The secondary processor 16(*b*) after receiving the unwind signal sends back an acknowledgment signal indicated by sequence arrow 7 indicating that all the data has been received based upon the task number in the transmission and the unwind command. At this time, back up processor 16(*b*) begins to transfer the data from quarantine register 58*b* to I/O data table 40*b* and output transmit buffers 59*b* associated with processor 16(*b*) as indicated by sequence number 8. This latter transfer transfers only changed data as indicated by flag register 60*b* and is extremely rapid as being accomplished internally to the processor 16(*b*). Accordingly in the event of a switch-over, the data in I/O data table 40*b* can be assured of reflecting a single scanning of program 32 and thus of not being time fragmented. If for some reason, the transmission process from processor 16(*a*) to processor 16(*b*) is interrupted, an unwind signal will not be received and no updating will occur.

When the primary processor 16(*a*) receives the acknowledgment signal 7, the primary processor 16(*a*) begins a transfer of output data for I/O data table 40*a* to the output transmit buffer 59*a* as indicated by sequence arrow 9. This transfer may begin at the same time as the transfer of sequence arrow 8 from quarantine register 58*b* to I/O data table 40*b*.

Only after the output transfer buffer 59*a* is updated is the output data transferred to the controlled process as indicated by sequence arrow 10.

As indicated by sequence arrow 11, a switch-over message may be received by secondary processor 16(*b*) at which time it undertakes to execute program 32' starting at its top indicated by program counter 36 using the data of data table 40*b*. This switch-over may occur at any time.

Figure 6:
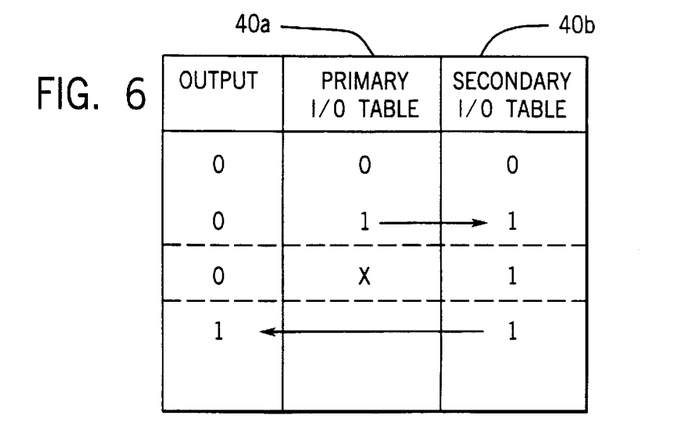
FIG. 6 is a table similar to that of FIG. 3 showing avoidance of the data bump problem with the sequence of data flow of FIG. 1.

Referring now to FIG. 6, it can be seen that the sequence of FIG. 5 eliminates data bumps by assuring that the secondary processor 16(*b*) has a complete copy of all output values before those output values are reflected to the actual outputs of the controlled process. In FIG. 6 as with FIG. 3, the first column indicates the state of an output to the controlled process, the second column indicates a data value of I/O data table 40*a* and the third column indicates a data value of I/O data table 40*b*. In a first interval in time, all values may be zero reflecting a previous updating of I/O data tables and outputs. At a second interval in time, represented by the second row of the table of FIG. 6, the user program 32 may write an output value of '1' to a primary I/O data table (in this case I/O data table 40*a*) which is then transmitted to the secondary I/O data table (in this case quarantine output data table 58*b*).

A switch-over at this interval does not cause a data bump because the value of '1' has not yet been transmitted to the controlled process. As mentioned above, the data transmitted to the secondary I/O table is quarantined until an unwind signal is received, so even an interruption during the transmission of data does not cause a problem.

At a third time interval represented by the third row of the table, a switch-over occurs. Still there is no data bump because the output value has not been sent to the controlled process. Only at the fourth interval in time represented by the fourth row of the table is the new output value transmitted from the secondary I/O data table to the output.

Figure 7:
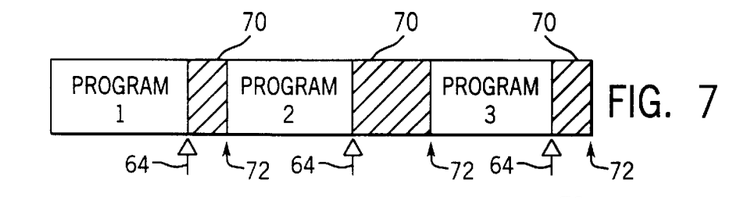
FIG. 7 is a graphical representation of the execution of multiple programs on the controller of FIG. 4 showing synchronization points and unwind points for I/O data transfer.

The present invention is intended to be used in a multi-tasking system in which tasks include multiple programs and where different tasks of different priorities may interrupt or pre-empt each other. Referring now to FIG. 7 in the execution of a single task with multiple programs, each program has its own synchronization point. The synchronization point is followed by packet collection portion 70 undertaking the transfer data from the I/O data table 40a to the data quarantine table 58b as has been previously described. The packet collection portion 70 concludes with the generation of an unwind signal 72.

Figures 8, 9:
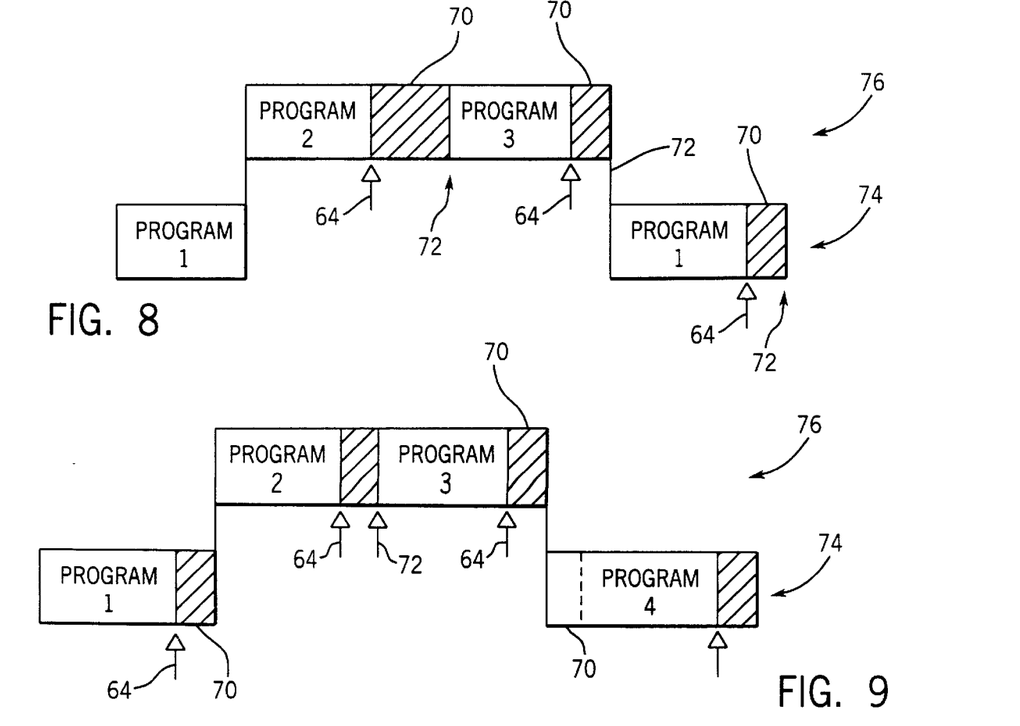
FIG. 8 is a figure similar to that of FIG. 7 showing execution of multiple programs having different priorities and the operation of the data table transfer when a low priority program is preempted.
FIG. 9 is a figure similar to that of FIG. 8 showing a preemption occurring during the period of the I/O data transfer.

Referring now to FIG. 8 in a multi-tasking system, a first program in a low priority task 74 may be preempted by a second and third program in a high priority task 76. In one case, the program '1' is pre-empted prior to reaching its synchronization point 64 by a program '2'. When program '2' reaches its synchronization point 64, it reviews the flag table 60a and transfers all the data indicated as having been changed including that data changed during the execution of program '1'. Program 2 sends an unwind signal causing the data of program '1' and '2' to be accepted by the secondary processor. Program '3' is then executed and at its synchronization point 64 accomplishes a similar transfer and then returns control upon completion of that transfer to program 1.

After the unwind signal of program '3', the flag register 60a has no set flags as all the data that has changed was transmitted. Accordingly program '1' continues to execute and when it reaches its synchronization point 64 transmits only the data changed in program '1' after the return of control to program '1'. Because in this case, a low priority task was interrupted by a high priority task, program '2' essentially preempts the changes of program '1' as would be desired. That is, changes by higher priority programs pre-empt changes by lower priority programs.

Referring now to FIG. 9 in a more complex circumstance, program '1' of a low priority task 74 is pre-empted by program '2' of a high priority task 76 after the synchronization point 64 of program '1' has been reached but prior to completion of the packet collection portion 70 of program '1'. In this case, untransmitted data of program '1' is again transmitted by program '2' which can distinguish between transmitted and untransmitted packets by the resetting of the flags of the flag table 60a as packets are collected.

A program '3' is then executed and its changes are sent during packet collection portion 70 of program '3' and control is returned to low priority task 74. At this time, the remainder of packet collection portion 70 of program 1 including the unwind signal would normally be executed. However, the packet collection routine of the operating program recognizing this occurrence via link buffer semaphores and suppresses the remainder of packet collection portion 70 so that program '4' may execute immediately without further data transfer by packet collection portion 70 of program '1'.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A secondary industrial controller providing redundancy with a primary industrial controller executing a user program to control an industrial process, the secondary industrial controller comprising:

(a) an electronic memory holding:
   (i) a copy of the user program describing the control of the process;
   (ii) a secondary I/O data table holding output values changed by the user program;
   (iii) a quarantine I/O data table;

(b) a processor communicating with the electronic memory and operating to:
   (i) receive transmission of output values from a primary industrial controller; at the end of execution of the user program by the primary industrial controller to the quarantine I/O data table; of the secondary industrial controller
   (ii) only after completion of the transmission of the output values into the quarantine I/O data table, transferring the output values from the quarantine I/O data table to the secondary I/O data table; and
   (iii) at a switch-over time, executing the copy of the user program to modify the output values in the secondary I/O data table and to transmit the output values from the secondary I/O data table to the industrial process wherein the electronic memory holds at least two user programs and wherein the secondary industrial controller receives identification of one current user program of the two programs from the primary industrial controller, and wherein, at switch-over time, the processor executes the one user current program.

2. The secondary industrial controller of claim 1 wherein the electronic memory also holds a flag table having flags indicating changes to the I/O data table, and wherein during the receipt of output values from the primary industrial controller, the processor sets flag indicating changes to the quarantine I/O data table and wherein;

the processor only transfers output values to the I/O data table indicated by the flags as having been changed in the quarantine I/O data table.

3. A method of providing back up of a primary industrial controller by a secondary industrial controller, each industrial controller having an electronic memory holding a user program describing the control of a controlled process and an I/O data table holding the output values provided to the controlled process, and having a processor communicating with the electronic memory, the method including the steps of:

(i) executing the user program in the primary industrial controller to write output values to the I/O data table of the primary industrial controller according to the user program;

(ii) transmitting at the end of the user program in the primary industrial controller, the output values from the primary industrial controller to the I/O data table of the secondary industrial controller without yet transmitting the output values to the process; and (iii) only upon completion of the transmission of the output values to the I/O data table of the secondary industrial controller, transmitting the output values from the primary industrial controller to the controlled process.

4. The method of claim 3 including the additional steps of:

(iv) receiving the output values from a primary industrial controller to the I/O data table of the secondary industrial controller;

(v) acknowledging to the primary industrial controller the receipt of the output values;

(vi) wherein transmitting of the output values to the controlled process by the processor of the primary industrial controller awaits receipt of the acknowledgment from the secondary industrial controller.

5. The method of claim 4 wherein the secondary industrial controller includes a duplicate I/O data table and wherein the method includes the additional steps of:

(vii) after completion of the reception of the output values by the I/O data table of the secondary industrial controller, transferring the output values to the duplicate I/O data table; and (viii) at a switch-over time, causing the secondary industrial controller to execute the user program to modify the output values in the duplicate I/O data table of the secondary industrial controller and to transmit the output values to the controlled process.

* * * * *